(No Model.) 2 Sheets—Sheet 2.

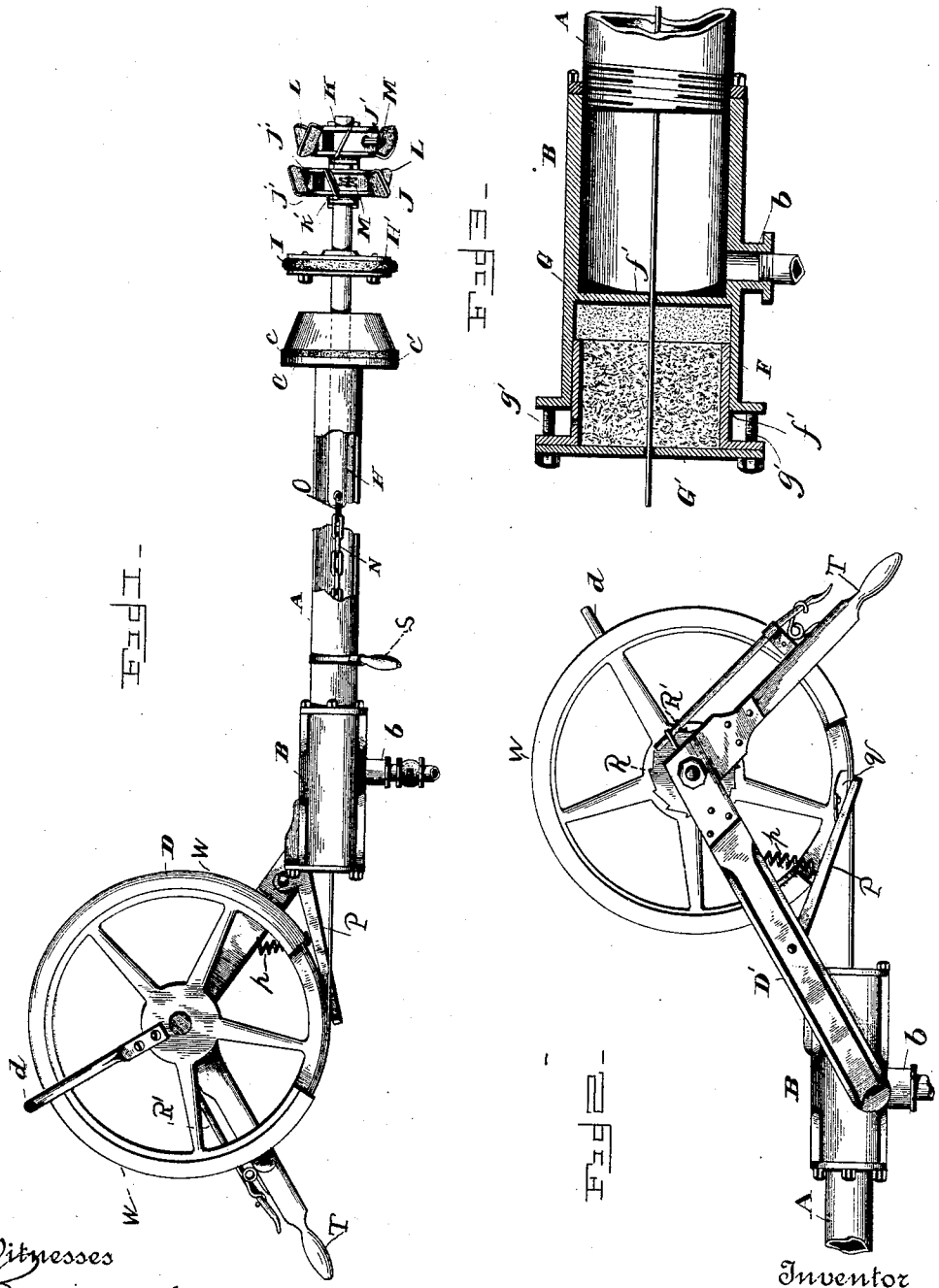

E. T. BELL.
FLUE CLEANER.

No. 480,653. Patented Aug. 9, 1892.

Witnesses
Paul W. Stevens
George H. Parmelee

Inventor
Enos T. Bell.
By his Attorney
E. W. Anderson.

UNITED STATES PATENT OFFICE.

ENOS T. BELL, OF DUBLIN, INDIANA.

FLUE-CLEANER.

SPECIFICATION forming part of Letters Patent No. 480,653, dated August 9, 1892.

Application filed November 30, 1891. Serial No. 413,590. (No model.)

*To all whom it may concern:*

Be it known that I, ENOS T. BELL, a citizen of the United States, and a resident of Dublin, in the county of Wayne and State of Indiana, have invented certain new and useful Improvements in Flue-Cleaners; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 4:
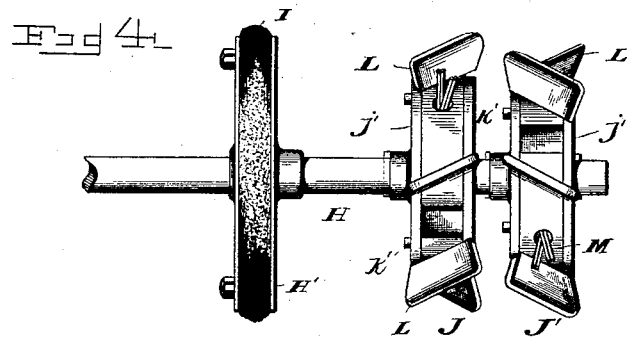
Figures 5, 6:
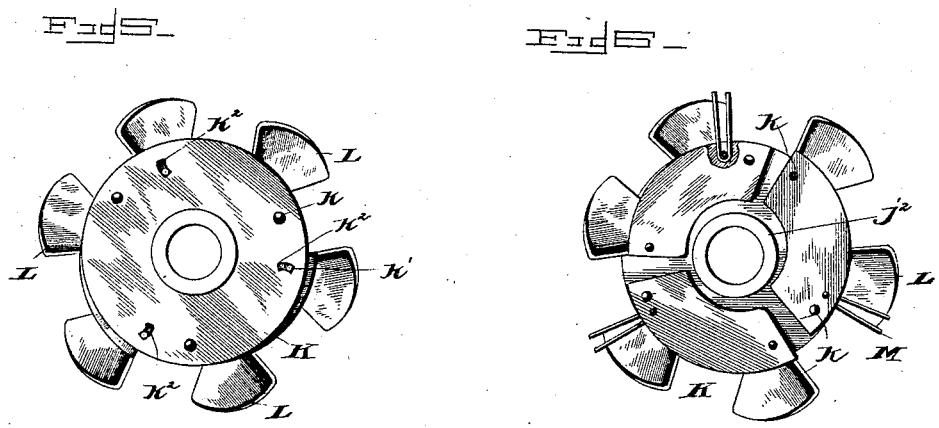
Figure 7:
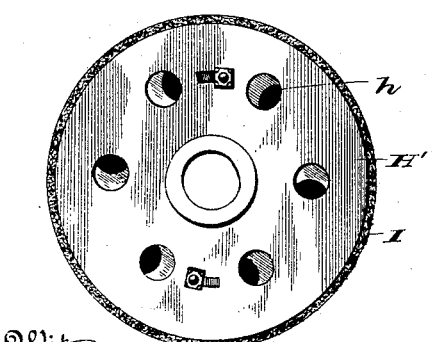
Figure 8:
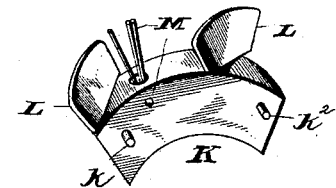

Figure 1 of the drawings is a representation of the invention in side elevation. Fig. 2 is a similar view of a portion of the same. Fig. 3 is a detail, partly in section, of the stuffing-box and coupling. Fig. 4 is an elevation of the brush devices. Figs. 5, 6, 7, and 8 are details of the brushes.

This invention has relation to certain new and useful improvements in flue-cleaners; and it consists in the novel construction and combination of parts, as hereinafter specified.

In the accompanying drawings, the letter A designates a pipe or tube connected at one end to a coupling B, provided with a steam-inlet $b$, to which is adapted to be connected a pipe from a steam-supply. The opposite end of the pipe is provided with a nozzle-piece C, fitted to enter the mouth of a flue steam-tight and provided with a gasket $c$, and prevented from slipping therefrom by a shoulder $c'$.

D designates a spool or drum provided with a crank $d$ and shown as having bearings on an axle-stud projecting from an arm D', which is secured to the coupling B. Extending through the pipe A and connected to and wound or carried upon the spool or drum is a flexible connection. This connection may consist of a chain or cable, but, as shown in the drawings, is preferably a flat steel ribbon. Where said ribbon enters the pipe A from the spool, it passes through a stuffing-box F, in order to prevent loss of steam from the interior of the coupling and pipe. This stuffing-box consists, preferably, of a cylindrical follower or shell fitting partially in a bore $f'$ in the rear portion of the coupling and held thereto. Said shell is filled with cotton or other similar suitable material which will become saturated with and retain oil, which may be supplied through an aperture through the upper portion of the shell. A rubber or flexible disk G may also be used back of the shell or follower, having a slot therein through which the ribbon passes. This disk is held between the inner end of the follower and the wall or partition $f''$ in the coupling, forming the inner wall of the stuffing-box. Any other suitable packing may be employed. By means of the screws $g'$, which pass through said follower and engage a flange on the coupling, the packing may be kept tight. The outer end of the stuffing-box is closed by a removable plate G', through which the ribbon also passes. This stuffing-box not only serves as a lubricator when the machine is in use, but is valuable also in that it always keeps the ribbon properly oiled.

Connected to the free end of the ribbon is a rod H, having thereon a piston-disk H', provided with a series of perforations $h$. The periphery of this piston is provided with an annular packing and wiping-ring I of suitable material. The piston is usually formed of two parallel disks having the wiping-ring held between their circumferential edges and provided each with a series of perforations. Said disks are secured together in such a manner that the adjustment of one or both may be changed to bring the perforations partly out of alignment to govern the admission of steam therethrough, as hereinafter more fully described.

J J' designate two brush-wheels bearing on said rod beyond the piston-disk. Although these wheels may be of various constructions, I prefer to construct them as now to be described. The hub or bearing portion of each wheel is provided with the two parallel disk flanges $j'$, separated from each other by an interval $j''$.

K K designate brush-carrying sections, which are each secured at one side or end between said flanges by a pivot-pin $k$ and at the opposite side by a pin $k'$, which has a vertical play in enlarged slots or apertures $k^2$ in said flanges. On each section K are formed the obliquely-disposed vertical wings or vanes L, and between these wings or vanes are the brushes M, which are preferably of wire and interchangeable, or they may be omitted entirely, as hereinafter described. The wings or vanes on the two wheels J and J' are preferably disposed at opposite angles, as shown.

The operation is as follows: Steam being admitted into the pipe A through the inlet $b$ of the coupling B, it enters the flue, in which the rod H, with its piston and brush-wheels, has been placed, through the nozzle C. Striking the piston-disk, the latter is forced through the flue, unwinding the ribbon from the spool or drum D and carrying with it the rod and brush-wheels. Jets of steam are forced through the openings $h$ of the piston-disk and striking against the oblique wings or vanes of the brush-wheels revolve the latter at a high rate and in opposite directions, owing to the opposite angles of the wings. The brushes being brought rapidly and successively in contact with the walls of the flue as they are carried therethrough loosen the soot and dirt, which is still further removed by the wiper-ring of the piston. Ordinarily, however, I prefer to omit the brushes M and to form the wings or vanes with sharp or cutting edges, which take the place of the brushes and are more effective in small flues. If any portion of the surface of the flue-wall escapes the action of the first wheel J, it will be cleaned by the wheel J'. As these wheels are revolved at a high rate of speed, the sections K will be thrown outwardly or expanded against the walls of the flue, which is permitted by their pivotal support on the wheels and the enlargement of the slots $k^2$, as hereinbefore described. By this arrangement the wings or brushes are forced into any uneven places or depressions in the walls of the flue and scrape or sweep all sides of the walls of the flue alike. If desired, however, I may connect any of the brushes ordinarily employed in cleaning flues to the rod H, or more than two brushes may be used. The connection between said rod and the end of the ribbon preferably consists of a short chain N, which prevents the ribbon from kinking in case the wheels or piston should strike any obstruction in the flues, causing them to come to a sudden stop. Said chain is preferably connected to the rod by a detachable hook—such as shown at O—so that the rod may be removed in case it is desired to apply the nozzle of the pipe A to the flue to blow out soot without running the brushes through.

P designates a stop-lever, which is pivotally secured to the arm D' and is held in proximity to the periphery of the wheel or drum D by a spring $p$. On the periphery of the wheel is a depression or stop-shoulder $q$, adapted to be engaged by an arm of said lever. When the ribbon is being unwound, this arm is kept from engagement with the shoulder by the ribbon. When, however, the end of the ribbon is reached, said arm comes into engagement with the stop to prevent said ribbon from being broken.

R is a ratchet carried by the wheel D and provided with a pawl R', which normally prevents the ribbon from being unwound.

S designates a handle adjustably secured on the pipe A. A suitable handle T is also provided for the drum. By means of the crank $d$ the ribbon may be rewound upon the spool, which will bring the rod H back through the flue for a subsequent operation or for use in a second flue. A guard W is provided on the spool to prevent the ribbon from slipping off.

By the construction of the brush-wheels in independent sections, as herein described, provision is made for replacing any of the wings or the brushes should they become broken.

Having described this invention, what I claim as new, and desire to secure by Letters Patent, is—

1. In a flue-cleaner, a brush-wheel comprising the parallel flanges having a plurality of sections secured therein, said sections having obliquely-disposed wings or vanes thereon, and means whereby said sections are thrown outwardly or expanded when the wheels are in operation, substantially as specified.

2. In a flue-cleaner, a brush-wheel comprising the parallel flanges having a plurality of brush-carrying sections pivotally and loosely held therein, said sections having obliquely-disposed wings or flanges thereon, substantially as specified.

3. In a flue-cleaner, a brush-wheel formed in a plurality of sections arranged to be thrown outwardly by the revolution of said wheel, said sections having obliquely-disposed wings or vanes thereon provided with cutting or scraping edges, substantially as specified.

4. In a flue-cleaner, a brush-wheel formed in a plurality of sections arranged to be expanded or thrown outwardly by the revolution of said wheel, said sections carrying obliquely-disposed wings or vanes having cutting or scraping edges, and also brushes, substantially as specified.

5. In a flue-cleaner, the combination, with the rod having the rotary brush-wheels thereon adapted to be driven in opposite directions and formed in expansible sections, of the piston-disk on said rod having the perforations therein adapted to direct jets of steam against said wheels and provided with a wiping-ring, substantially as specified.

6. In a flue-cleaner, the combination, with the steam-actuated rod carrying the perforated piston-disk and the oppositely-driven brush-wheels, of the pipe or tube, the reel connected thereto, but outside thereof, and independent of the steam-supply, the ribbon carried by said reel and passing through said tube, and the slack connection between said ribbon and rod, substantially as specified.

7. In a flue-cleaner, the combination, with the pipe or tube having the gasketed nozzle adapted to form a steam-tight joint with the mouth of the flue, of the coupling to which said pipe is connected, said coupling having the steam-inlet, and the stuffing-box comprising the case or shell held in the end of said coupling and having a saturated filling, and a flexible disk held between the end of said shell and an interior wall of the coupling, substantially as specified.

8. In a steam-actuated flue-cleaner, the combination, with the pipe or tube having the nozzle adapted to form a steam-tight joint with the mouth of a flue, the coupling connected to said pipe and provided with the steam-inlet and the stuffing-box, of the reel or spool connected to said coupling, the flexible ribbon or cable carried thereby and passing through said stuffing-box, coupling, and pipe, the rod having a slack connection with said ribbon, and the rotary cleaners carried by said rod and operated by jets of steam from said pipe, substantially as specified.

9. In a steam-operated cleaner, the combination, with the pipe or tube having the nozzle thereon, the coupling connected to said pipe and having the steam-inlet, and the stuffing-box, of the reel connected to said coupling, the crank therefor, the guard for the ribbon, the pawl-and-ratchet devices for normally holding said reel, and the spring-stop adapted to automatically engage said reel when the ribbon has been unwound, substantially as specified.

10. In a flue-cleaner, the combination, with the ribbon or cable and the cleaning device connected thereto, of the reel carrying said ribbon and having the guard, the crank, the pawl, and the spring-actuated stop adapted to come into engagement with a notch or shoulder on the periphery of the reel when the ribbon is unwound therefrom, substantially as specified.

11. The combination, with the pipe or tube having the gasketed nozzle at one end and connected at the opposite end to a coupling provided with a steam-inlet, of the stuffing-box in said coupling, said box comprising the case or shell having a saturated filling, substantially as specified.

12. A flue-cleaner comprising the pipe or tube having the gasketed nozzle at one end and adapted to form a steam-tight joint with a flue-mouth, the coupling connected to said pipe and provided with a steam-inlet and with a stuffing-box, a reel or spool carried by said coupling, a ribbon or cable carried by said spool or reel and passing through said stuffing-box, coupling, and pipe, the rod connected to said ribbon or cable, the perforated piston-disk on said rod and provided with a wiping ring, and the rotary brush-wheels adapted to be driven in opposite directions by steam admitted into said pipe, substantially as specified.

In testimony whereof I affix my signature in presence of two witnesses.

ENOS T. BELL.

Witnesses:
JACOB WILLIAMS,
JAMES W. HARVEY.